(12) United States Patent
Ghiotto

(10) Patent No.: US 10,215,171 B2
(45) Date of Patent: Feb. 26, 2019

(54) APPARATUS FOR FEEDING GAS MIXTURES AT THE INTAKE OF A HIGH PRESSURE COMPRESSOR

(71) Applicant: NARDI COMPRESSORI S.R.L., Montecchio Maggiore (IT)

(72) Inventor: Marco Ghiotto, Montecchio Maggiore (IT)

(73) Assignee: NARDI COMPRESSORI S.R.L., Montecchio Maggiore (IT)

( * ) Notice: Subject to any disclaimer, the term of this patent is extended or adjusted under 35 U.S.C. 154(b) by 0 days.

(21) Appl. No.: 15/720,082

(22) Filed: Sep. 29, 2017

(65) Prior Publication Data

US 2018/0094628 A1   Apr. 5, 2018

(30) Foreign Application Priority Data

Sep. 30, 2016  (IT) .......................... 102016000098296

(51) Int. Cl.
*F04B 49/22* (2006.01)
*F04B 37/12* (2006.01)
(Continued)

(52) U.S. Cl.
CPC ............ *F04B 49/225* (2013.01); *F04B 37/12* (2013.01); *F04B 37/18* (2013.01); *F04B 49/06* (2013.01);
(Continued)

(58) Field of Classification Search
CPC .......... F04B 25/00; F04B 27/12; F04B 27/18; F04B 49/06; F04B 49/12; F04B 49/225; F04B 51/00; F17C 2201/0119; F17C 2201/056; F17C 2201/031; F17C 2201/0123; F17C 2221/031; F17C 2221/0123; F17C 2223/0123;
(Continued)

(56) References Cited

U.S. PATENT DOCUMENTS 3,807,396 A * 4/1974 Fischel ................ F25J 3/04981
                                                        128/201.21
4,206,753 A * 6/1980 Fife ........................ A62B 13/00
                                                        128/201.21
(Continued)

*Primary Examiner* — William McCalister
(74) *Attorney, Agent, or Firm* — Abelman, Frayne & Schwab

(57) ABSTRACT

An apparatus for feeding gas mixtures to a compressor comprising a tubular mixing pipe connected with the compressor intake, first and second gas intake devices injecting into the mixing pipe gas received from a Helium source and an Oxygen source respectively, two sensors measuring the Oxygen percentage of the gas mixture, a first servo-controlled throttling valve interposed between the first gas intake device and the Helium source, a second servo-controlled throttling valve interposed between the second gas intake device and the Oxygen source, and a control unit configured to manage the throttling valves depending on the Oxygen percentages of the gas mixture measured by the sensors. The apparatus includes first and second auxiliary pressure regulators, electrically connected with the control unit, interposed respectively between the first servo-controlled valve and a manual regulator of the Helium source and between the second servo-controlled valve and a manual regulator of the Oxygen source.

11 Claims, 1 Drawing Sheet

(51) Int. Cl.
　　*F04B 37/18*　　(2006.01)
　　*F04B 49/06*　　(2006.01)
　　*F04B 49/12*　　(2006.01)
　　*F04B 51/00*　　(2006.01)
　　*F17C 5/06*　　(2006.01)
　　*G05D 11/13*　　(2006.01)
　　*F04B 25/00*　　(2006.01)

(52) U.S. Cl.
　　CPC .............. *F04B 49/12* (2013.01); *F04B 51/00* (2013.01); *F17C 5/06* (2013.01); *G05D 11/138* (2013.01); *G05D 11/139* (2013.01); *F04B 25/00* (2013.01); *F17C 2201/0119* (2013.01); *F17C 2201/056* (2013.01); *F17C 2221/031* (2013.01); *F17C 2223/0123* (2013.01); *F17C 2225/0123* (2013.01); *F17C 2225/036* (2013.01); *F17C 2250/032* (2013.01); *F17C 2250/0452* (2013.01); *F17C 2250/0647* (2013.01); *F17C 2265/025* (2013.01); *F17C 2270/025* (2013.01); *F17C 2270/0781* (2013.01); *Y10T 137/2509* (2015.04)

(58) Field of Classification Search
　　CPC ........ F17C 2225/0123; F17C 2225/036; F17C 2250/032; F17C 2250/0452; F17C 2250/0647; F17C 2265/025; F17C 2270/0781; F17C 5/06; G05D 11/138; G05D 11/139; Y10T 137/2509
　　USPC .......................................................... 137/93
　　See application file for complete search history.

(56) References Cited

U.S. PATENT DOCUMENTS

| | | | | |
|---|---|---|---|---|
| 4,860,803 A | * | 8/1989 | Wells | A62B 9/00 141/9 |
| 5,022,442 A | * | 6/1991 | Bird | B01F 3/02 141/100 |
| 5,404,921 A | * | 4/1995 | Lamoreaux | B63C 11/02 141/145 |
| 5,427,160 A | * | 6/1995 | Carson | F17C 5/06 137/7 |
| 5,611,845 A | * | 3/1997 | Delp, II | B01D 53/22 96/10 |
| 5,837,027 A | * | 11/1998 | Olander | B01D 53/0446 95/14 |
| 5,913,344 A | * | 6/1999 | Wronski | F17C 5/005 141/4 |
| 6,719,019 B2 | * | 4/2004 | Cao | F17C 5/00 137/565.29 |
| 6,904,913 B2 | * | 6/2005 | Aylsworth | A61M 16/10 128/204.22 |
| 7,263,995 B2 | * | 9/2007 | Gurnee | A61G 10/026 128/202.12 |
| 2002/0040715 A1 | * | 4/2002 | Barrett | F04B 25/00 128/205.18 |
| 2003/0234019 A1 | * | 12/2003 | Grubb, Jr. | B01F 3/028 128/204.22 |
| 2004/0041709 A1 | * | 3/2004 | Forster | B65D 7/045 340/603 |
| 2005/0066814 A1 | * | 3/2005 | Huebner | B01D 53/22 96/4 |
| 2006/0283517 A1 | * | 12/2006 | McCulloh | F17C 5/06 141/2 |
| 2006/0290525 A1 | * | 12/2006 | Andersen | A61M 16/0051 340/632 |
| 2008/0173073 A1 | * | 7/2008 | Downie | F17C 13/025 73/49.8 |
| 2009/0025824 A1 | * | 1/2009 | Noujima | C01B 3/26 141/93 |
| 2010/0065146 A1 | * | 3/2010 | Plummer | F17C 13/003 141/2 |
| 2010/0101579 A1 | * | 4/2010 | Levy | F17C 5/06 128/205.24 |
| 2015/0377417 A1 | * | 12/2015 | Rado | F17C 5/06 141/369 |

* cited by examiner

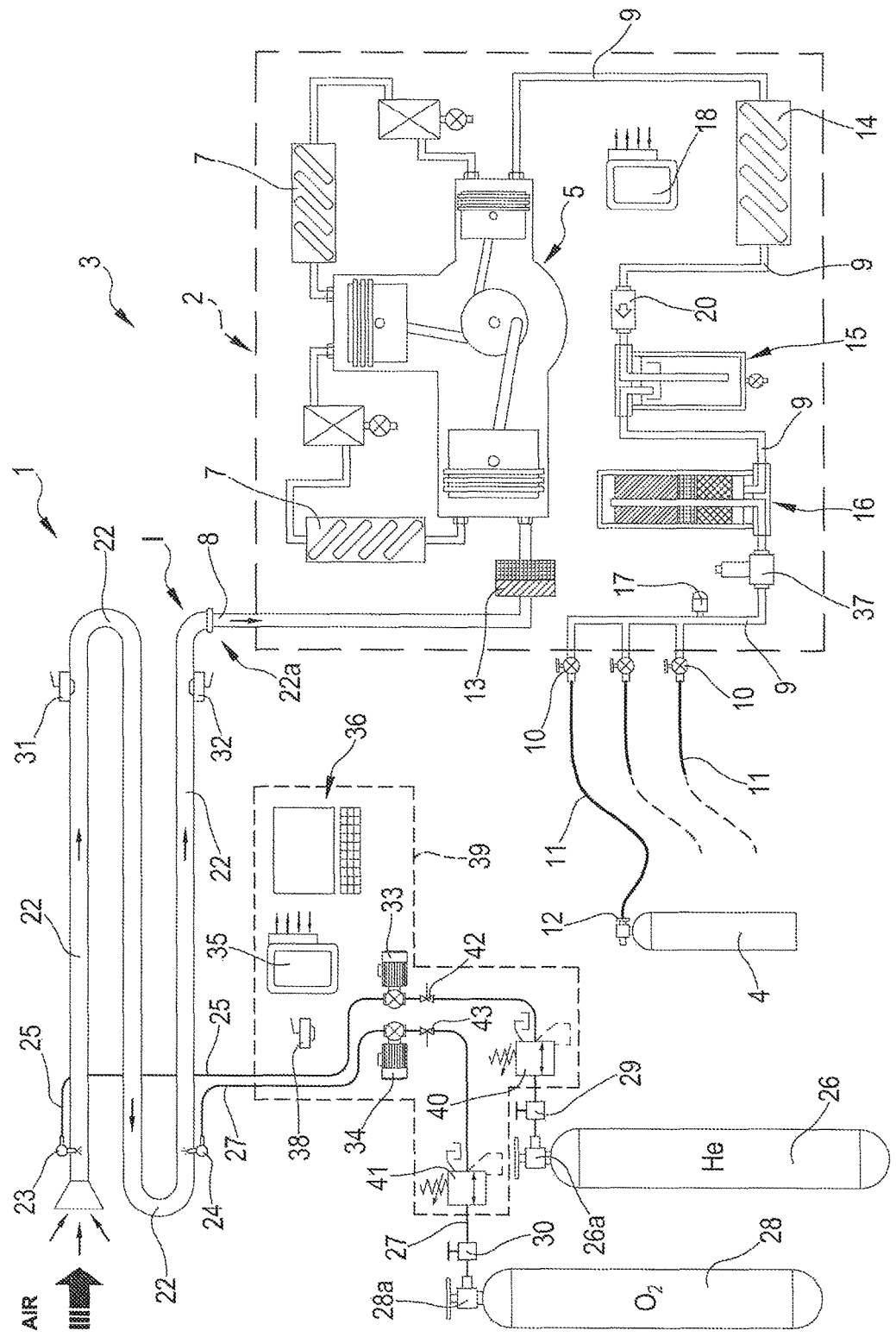

APPARATUS FOR FEEDING GAS MIXTURES AT THE INTAKE OF A HIGH PRESSURE COMPRESSOR

CROSS REFERENCE TO RELATED APPLICATION

This application claims priority to IT patent application No. 102016000098296, filed Sep. 30, 2016, which is incorporated herein by reference thereto.

FIELD OF THE INVENTION

The present invention relates to an improved apparatus for feeding gas mixtures at the intake of a high pressure compressor.

More in detail, the invention relates to an improved apparatus for feeding breathable gas mixtures with pre-established stoichiometric ratios of oxygen, nitrogen and helium at the intake of a high pressure compressor for filling cylinders for diving, especially technical diving or competitive-sport diving.

The following discussion will make explicit reference to this type of use of the improved apparatus of the invention, without thereby losing generality.

BACKGROUND OF THE INVENTION

As it is well known, diving cylinders are containers of essentially cylindrical shape with a capacity usually lower than 18 liters, which are structured to contain breathable air with nominal maximum pressure traditionally in the range between 200 to 300 bar.

This type of cylinders is usually filled by means of special high pressure compressors which are structured in such a way as to be able to aspirate air at ambient pressure, and deliver at the output an appropriately filtered and dehumidified air flow, with nominal pressure greater than 200-300 bar.

On some circumstances, the diving cylinders can also be filled with breathable gas mixtures where the stoichiometric ratios between oxygen, nitrogen and any other gases are radically different from those one typical of the breathable air.

In these cases, the filling of the cylinder is carried out with radically changing systems depending on the composition of the breathable gas mixture that must be fed into the cylinder.

More specifically, in case of breathable gas mixtures formed by oxygen and nitrogen with oxygen percentage greater than that one present in the air (that is, with an oxygen percentage greater than 21%, commonly known in the market also with the term Nitrox), the cylinders are filled through high pressure compressors which present, at the intake of the sucking manifold, one or more nozzles which are able of injecting pure oxygen into the air flow at ambient pressure that flows along the sucking manifold towards the aspiration mouth of the pumping group.

These nozzles are connected with pure oxygen tank at high pressure by interposing a pressure reducer and a solenoid valve which is driven by a dedicated electronic control unit in such a way as to pump in into the sucking manifold of the compressor a flow of pure oxygen substantially constant over time, whose value is a function of the percentage of oxygen that the breathable gas mixture must have at the output of the compressor.

In other words the electronic control unit calculates, as a function of the oxygen and nitrogen percentages attributed to the breathable gaseous mixture, what is the correct pure oxygen flow to be sent to the sucking manifold of the compressor in order to get, at the output of the high pressure compressor, the breathable gas mixture with the required oxygen and nitrogen percentages, and then drives the solenoid valve placed upstream the nozzles so that the pure oxygen flow directed towards the nozzles is always equal to the calculated oxygen flow.

In case, instead, of breathable gaseous mixtures with low oxygen percentages and high helium percentages (i.e. breathable gaseous mixtures formed by oxygen, nitrogen and helium in percentages other than those ones found in the air, commonly known in the market also with the term Trimix), used by some divers for the most demanding diving, the cylinders are usually filled up through subsequent dumps by directly feeding into the cylinder, separately and in successive stages, the required amounts of oxygen, nitrogen and helium.

Basically, the breathable gas mixture with the required composition is made directly into the cylinder by manually entering the latter, separately and in successive stages, the appropriate amounts of oxygen, nitrogen and helium.

It is briefly reminded herein that the amount of oxygen within the Trimix gas mixture must not have a partial pressure higher than 160 kPa. Pure oxygen can be used at a maximum depth of 6 meters: beyond such a depth oxygen is toxic to the central nervous system of the human being.

In addition, nitrogen is a heavy gas and beyond a depth of 30 meters (400 kPa) becomes narcotic because it enters solution in the lipid layers of the body that make up the neurons and interferes with normal signals, giving a sense of drunkenness to the human being: the more pressure increases this effect becomes stronger.

For its part, however, helium is, as it is well-known, a lighter and more inert gas and enters solution in the tissues present in the human body more quickly but at the same time exits from tissues at the same speed: the presence of helium in the gaseous mixture decreases the amount of gases contained in the air (oxygen and nitrogen), thus reducing the narcotic effect of nitrogen and giving more lucidity during deep dives.

Unfortunately, the filling system through subsequent dumps currently requires the availability of large tanks of oxygen, nitrogen and helium with pressures greater than 200-300 bar, i.e. with pressures higher than the maximum nominal filling capacity of the cylinder, with the costs that this involves.

Moreover, addition of pure oxygen at high pressure inside the cylinder is a particularly dangerous operation that can cause explosions, with all the operative problems that this implies.

Despite the above drawbacks, the filling system for subsequent dumps remains at present substantially the most widespread procedure for obtaining, quickly and with acceptable error margins, breathable gas mixtures with the desired stoichiometric composition.

There is, indeed, an alternative system, of manual type, for filling the cylinder: it employs a mixer and electronic control performed only on the percentage of gas (nitrogen or helium) and on the driving of the solenoid valve solely dedicated to the gas opening and closure, while for regulating the flow manual regulators or chokes, thus manoeuvred by the user, are provided.

Up to now, indeed, the attempts to accurately get a prefixed breathable gaseous mixture by injecting into the air flow entering the intake manifold of the compressor, in parallel, a constant flow of pure oxygen and a constant flow of pure helium have not given the results hoped for: the breathable gas mixtures obtained with such a system are, indeed, affected by random errors in oxygen, nitrogen and helium fractions often exceeding 10%, which represents an absolutely irreconcilable margin of error with an industrial use.

These disadvantages have been overcome by the invention described in the Italian patent no. 1415144 filed and granted in the name of the same applicant of the present invention, which describes an apparatus for feeding breathable gas mixtures with pre-established stoichiometric ratios of oxygen, nitrogen and helium at the intake of a high pressure compressor for filling diving cylinders, which allows to get, at the output of high pressure compressor itself breathable gas mixtures with errors in oxygen, nitrogen and helium fractions which are minimal, acceptable for an industrial, technical and professional use, however significantly lower than the state of the art of that time.

The technical teachings, the purpose and the whole technical matter contained in the aforesaid Italian patent no. 1415144 are fully incorporated in the present invention as base reference and constitute the starting point (so-called the closest prior art) thereof.

However, even the apparatus for feeding gas mixtures at the intake of a high pressure compressor described in the Italian patent no. 1415144 and also proposed on the market by the applicant presents some operative limitations, mainly related to the inherent constructional features of the two servo-controlled throttling valves (or flow adjusters) driven by the electronic control unit and interposed respectively between the first gas intake device and the source (typically a 200 bar tank) of pressurized helium and between the second gas intake device and the source (again typically a 200 bar reservoir) of pressurized oxygen.

Indeed, the structural and constructive limitation of the servo-controlled throttling valves, determined by the opening through which the gas—oxygen or helium—flow passes through them, prevents to get determined flow rates (in liters/minute) which are discharged to the compressor and which the latter, in certain operative or use conditions, inevitably and necessarily requires.

In essence, therefore, each of the servo-controlled throttling valves of which the apparatus of the known type described in the Italian patent no. 1415144 is provided (and which, it is stated precisely, are designed to operate at pressures not exceeding 8 bar) allows to achieve a certain maximum flow rate (in liters/minute) beyond which, constructively, it does not anyway allow to go, although the use, represented by the compressor at high pressure, sometimes requires a greater flow than that one obtainable with these pressure values.

In addition, the pressure reducer associated with the gas cylinder (both for nitrogen and for helium) which allows to adjust the pressure of the gas to be mixed, ranging from 200 or 300 bar to values between 1 and 8 bar, presents the disadvantage of providing gas at a fixed pressure, still manually adjusted by the operator or the user.

To meet the aforesaid incremental operative requirements of the high pressure compressor, the user is then obliged to intervene manually on the pressure reducer just of the gas source—oxygen tank or helium tank—installed as known in its upper part, opening it of what is necessary to increase the gas pressure and allow to supply to the compressor a required gas flow (for Bernoulli's equation, the flow is, indeed, directly proportional to the pressure), which is in any case fixed.

This inevitably negatively affects timing and precision of the filling operations of the diving cylinders, resulting in the user's dissatisfaction or incomplete satisfaction.

SUMMARY OF THE INVENTION

The present invention seeks to overcome this drawback which manifests in the prior art in the still innovative apparatuses for feeding gas mixtures at the intake of a high pressure compressor, already proposed on the market by the applicant.

In particular, main purpose of the invention described herein is to provide an improved apparatus for feeding gas mixtures at the intake of a high pressure compressor allowing to adjust (by increase or decrease) the pressure of gas—oxygen or helium—to be added into the gaseous mixture supplied to the compressor itself more precisely, more easily, more practically and more quickly than the current state of the art.

In the cognitive sphere of this purpose, it is task of the present invention to provide an improved apparatus for supplying gas mixtures intake to a high pressure compressor which, with respect to similar known devices, allows to expand the dispensable flow rates to the compressor itself.

Likewise, it is another purpose of the present invention to provide an improved apparatus for feeding gas mixtures at the intake of a high pressure compressor which, compared to the equivalent apparatuses of the prior art allows to expand the adjustment range of the servo-controlled or motorized throttling valves (or flow regulators or flow rate regulators) belonging to them.

It is a further task of the invention to indicate an improved apparatus for feeding gas mixtures at the intake of a high pressure compressor which is able to satisfy the needs of the user better and wider than the prior art.

Said purposes are achieved by means of an improved apparatus for feeding gas mixtures at the intake of a high pressure compressor as in the attached claim 1, as hereinafter referred for the sake of brevity exposure.

Further technical details of the an improved apparatus for feeding gas mixtures at the intake of a high pressure compressor of the present invention are contained in the corresponding dependent claims.

The aforementioned claims, hereinafter specifically and concretely defined, are integral part of this description.

Advantageously, the an improved apparatus for feeding gas mixtures at the intake of a high pressure compressor, object of the invention, allows to control automatically, thus precise, rational and immediate the adjustment the pressure of the gas (oxygen or helium) conveyed to the respective servo-controlled throttling valves in order to increase/decrease the flow (or flow rate) of the gaseous mixture which is subsequently directed to the high pressure compressor.

This depends on the fact that the improved apparatus of the invention includes a first auxiliary pressure regulator and a second auxiliary pressure regulator, both electrically connected with the electronic control unit which manages their operation, the first of which interposed between the first servo-controlled throttling valve and the high pressure manual regulator (adjusted to 8 bar) of the pressurized helium source and suitable to vary (by increasing or reducing it, depending on the requirements of the high pressure compressor) the helium pressure entering into the first servo-controlled throttling valve and the second of which interposed between the second servo-controlled throttling valve and the high pressure manual regulator (adjusted at 8 bar) of the pressurized oxygen source and, as the previous one, suitable to vary the oxygen pressure entering into the second servo-controlled throttling valve.

Still advantageously, the improved apparatus for feeding gas mixtures at the intake of a high pressure compressor of the present invention allows to automatically extend with respect to the current state the adjustment range of the servo-controlled throttling valves (motorized flow regulators) and, by return, the flow values of the gas mixture to the high pressure compressor.

Equally advantageously, the improved apparatus for feeding gas mixtures at the intake of a high pressure compressor of the invention, while achieving the purposes and obtaining the abovementioned advantages, by consequence, allows to improve the operation of the electronic control unit which is, indeed, able to manage more precisely even the motorization means which control the opening and closing of the servo-controlled throttling valves and, consequently, to stabilize the gas mixture intended to the high pressure compressor.

In advantageous manner, moreover, the invention, by means of the two auxiliary pressure regulators mounted one upstream each servo-controlled throttling valve and both controlled by the electronic control unit, allows to achieve the advantages of the preceding paragraphs but without being accompanied by those disadvantages which would derive from operating in analogous way the pressure reducers just of the oxygen source (tank) and the helium source (tank) in which the gas is normally at 200 bar: the electronic actuation of these reducers pressure would not be possible because the movement of the motorization means (preferably, electric motors) to open/close the servo-controlled throttling valves would in no way be adjustable and effectively and efficiently manoeuvred for the purpose of using the improved apparatus involved in the present discussion.

Said purposes and advantages, as well as other ones that will emerge in the following discussion, will become more evident from the following description, relating to a preferred embodiment of the improved apparatus for feeding gas mixtures at the intake of a high pressure compressor, object of the invention, given by indicative and illustrative but not limitative way, with the aid of the accompanying drawing table in which its only FIG. 1 is a schematic and simplified view of a filling plant of diving cylinders using the apparatus for feeding gas mixtures at the intake of a high pressure compressor of the present invention.

BRIEF DESCRIPTION OF THE DRAWING

The apparatus for feeding gas mixtures at the intake of a high pressure compressor of the invention is generically and schematically shown in FIG. 1, where it is globally numbered with 1.

DETAILED DESCRIPTION OF THE INVENTION

The improved apparatus 1 of the invention is, thus, structured to be positioned upstream the high pressure compressor 2 of a plant, generically indicated with 3, for filling diving cylinders with breathable high pressure gas mixtures, in such a way as to feed at the intake of the high pressure compressor 2 itself a breathable gas mixture with prefixed composition.

More in detail, the plant 3 is structured to fill one or more cylinders 4 (hence the presence of more dotted flexible pipes, numbered with 11) for diving with a breathable gas mixture with a pressure higher than 150 bar and preferably even higher than 200 bar, and the improved apparatus for feeding gas mixtures 1 of the invention is structured so as to feed at the intake of the high pressure compressor 2 of the plant 3 a breathable gas mixture with prefixed stoichiometric ratios of oxygen, nitrogen and helium, i.e. a breathable gas mixture with specified oxygen, nitrogen and/or helium percentages.

In the illustrated example, in particular, the high pressure compressor 2 is a multistage-structured volumetric compressor, which is specifically structured/dimensioned to suck air or any other gaseous mixture at ambient pressure, and to deliver at the output an air flow or other gaseous mixture at high pressure, with feed pressure greater than 150 bar and preferably even greater than 200 bar.

With reference to FIG. 1, in the example shown, in particular, the high pressure compressor 2, preferably, comprises a piston pump assembly 5 having multistage structure, which is provided with a series of variable volume chambers connected in cascade one followed by the other, and is structured/dimensioned to be able to suck air or other gaseous mixture at ambient pressure, and to provide at the output a flow of air or other gaseous mixture at high pressure, with a delivery pressure preferably greater than 200 bar.

The high pressure compressor 2 also includes a drag engine, preferably an electric or blast engine (not shown), which is mechanically coupled with the pump assembly 5 so as to cyclically and seamlessly vary the volume of the various variable volume chambers.

Preferably, the high pressure compressor 2 also comprises a number of heat exchangers 7 that are positioned along the ducts connecting the variable volume chambers of the pump assembly 5 one in cascade to the other and are structured in such a way as to cool the gas mixture flowing from a variable volume chamber to the adjacent one.

FIG. 1 shows that the high pressure compressor 2 is, furthermore, equipped with an intake manifold 8 which is structured in such a way as to connect the input of the first variable volume chamber of the pump assembly 5 (i.e., the suction mouth of the pump group 5) with the outside, and a discharge manifold 9 which is structured so as to connect the output of the last variable volume chamber of the pump assembly 5 (i.e., the delivery mouth of the pump assembly 5) with one or more manually-operated shut-off valves 10, each of which communicates directly with a corresponding flexible pipe 11 which, in turn, ends with a connector or connection manifold 12 specifically designed for removably coupling to the tap of a generic cylinder 4 for diving activities.

The flexible pipe 11 and the connector or connection manifold 12 are structured in such a way as to convey air or other gas mixture at high pressure from the discharge manifold 9 of the compressor to the cylinder 4.

The manually operated shut-off valve 10 is in turn structured in such a way as to selectively allow or prevent the outflow of the air or other high pressure gas mixture at high pressure from the discharge manifold 9 towards the cylinder 4.

Preferably, the high pressure compressor 2 further comprises a filtering assembly 13 which is positioned along the sucking manifold 8 of the compressor, preferably immediately upstream the first variable volume chamber of the pump assembly 5, and is structured in such a way as to retain the impurities present in the flow of air or other gaseous mixture flowing along the sucking manifold 8 towards the first variable volume chamber of the pump assembly 5.

In addition, the high pressure compressor 2 includes, in preferred but not binding way, a heat exchanger 14 which is positioned along the discharge manifold 9 of the compressor 2 itself, preferably immediately downstream the last variable volume chamber of the pump assembly 5, and is structured in such a way as to cool the air or other gas mixture at high pressure flowing along the discharge manifold 9 towards the shut-off valves 10.

Still in FIG. 1 it is shown that the high pressure compressor 2 is also preferably provided with:

a gas/liquid separator unit 15 positioned along the discharge manifold 9 downstream the heat exchanger 14 and is structured in such a way as to retain in its inside the droplets of oil and condensate water vapor present in the air or in another gaseous mixture high pressure flowing along the discharge manifold 9, towards the manually operated shut-off valve or valves 10;

a second filtering assembly 16 preferably of the active carbon type, which is positioned along the discharge manifold 9 downstream the gas/liquid separator unit 15 and is structured in such a way as to retain impurities present in the flow of air or other gaseous mixture at high pressure flowing along the discharge manifold 9, towards the manually operated shut-off valve or valves 10.

In addition, in preferred but not exclusive manner, the high pressure compressor 2 also includes a pressure transducer 17 which is positioned along the discharge manifold 9, preferably immediately upstream the shut-off valve or valves 10, and is structured in such a way as to provide at the output an electric signal that is indicative of the pressure value of the air or other gas mixture at high pressure present within the discharge manifold 9.

Preferably, but not necessarily, the high pressure compressor 2 also comprises a control unit 18 which is connected with the pressure transducer 17 so as to receive the electric signal, and is configured so as to determine the pressure value present within the discharge manifold 9 on the basis of the received electric signal, and to turn off/disactivate the drag engine when the value of the air pressure or other gas mixture present within the discharge manifold 9 exceeds a pre-established upper limit value $P_{max}$, preferably but not necessarily in the range of 200 to 300 bar.

Since during recharging the cylinder 4 is in direct communication with the discharge manifold 9, it is assumed that the cylinder 4 is fully charged when the pressure of the breathable gas mixture contained within the cylinder 4 reaches the upper limit value $P_{max}$.

Preferably, the upper $P_{max}$ limit value can also be selected at will by the user in a range of 200 to 300 bar.

Always in FIG. 1 it is pointed out that, preferably but not necessarily, the high pressure compressor 2 also includes a non-return valve 20 which is positioned along the discharge manifold 9, preferably immediately downstream the heat exchanger 14 (that is, between the heat exchanger 14 and the gas/liquid separator unit 15) and is oriented in such a way as to prevent the air (or gaseous mixture suitably usable) at high pressure flowing solely towards the shut-off valve or valves 10.

This duly placed and returning to the main object and to the core of the invention described herein, it can be observed in FIG. 1 that the improved apparatus 1 comprises:

a tubular mixing pipe 22 which present a first end 22a suitable to be connected with the intake I of a sucking manifold 8 of a high pressure compressor, overall indicated with 2;

a first gas intake device 23 placed along the mixing pipe 22 and suitable to inject inside the mixing pipe 22 the gas received from a pressurized Helium source (cylinder or tank) 26;

a second gas intake device 24 placed along the mixing pipe 22, downstream the first gas intake device 23, and suitable to inject into the mixing pipe 22 the gas received from a of pressurized Oxygen source (cylinder or tank) 28;

a first Oxygen-measurement sensor 31 and a second Oxygen-measurement sensor 32 placed along the mixing pipe 22 downstream the first gas intake device 23 and the second gas intake device 24: these Oxygen-measurement sensors 31, 32 have the function to measure (or determine) the percentage of Oxygen of the gas mixture (composed of air, helium and oxygen) located in their respective surrounding;

a first servo-controlled throttling valve 33 (which can be otherwise defined as motorized flow regulator) interposed between the first gas intake device 23 and the pressurized Helium source 26 and adapted to regulate (or control) the gas flow direct towards the first gas intake device 23;

a second servo-controlled throttling valve 34 (which can be otherwise defined as motorized flow regulator as well) interposed between the second gas intake device 24 and the pressurized Oxygen source 28 and adapted to regulate (or control) the flow of gas directed towards the second gas intake device 24;

an electronic control unit 35 configured in such a way as to drive the first 33 and the second throttling valve 34 on the basis of the Oxygen percentages of the gas mixture measured/determined by the Oxygen-measurement sensors 31, 32, so that the percentages of Oxygen, Nitrogen and Helium of the gas mixture coming out of the mixing pipe 22 keep substantially equal to some prefixed target percentages of Oxygen, Nitrogen and Helium.

According to the invention, the improved apparatus 1 includes a first auxiliary pressure regulator 40 and a second auxiliary pressure regulator 41, both electrically connected with the electronic control unit 35 which manages operation thereof, the first of which (numbered with 40) interposed between the first servo-controlled throttling valve 33 and the high pressure manual regulator 29 (adjusted at 8 bar by the user) of the pressurized Helium source 26 and adapted to vary (by increasing or reducing it, depending on the requirements downstream the high pressure compressor 2) the pressure of the Helium entering into the first servo-controlled throttling valve 33 and the second of which (numbered with 41) interposed between the second servo-controlled throttling valve 34 and the high pressure manual regulator 30 (adjusted at 8 bar by the user) of the pressurized Oxygen source 28 and, as the previous one, adapted to vary of the Oxygen entering into the second servo-controlled throttling valve 34.

More in detail, the first auxiliary pressure regulator 40 is installed along a first connecting pipe 25 adapted to connect the first gas intake device 23 (such as a spraying nozzle, typically) with the pressurized Helium source 26, and second auxiliary pressure regulator 41 is installed along a second connecting pipe 27 adapted to connect the second gas intake device 24 (such as a spraying nozzle, typically) with the pressurized Oxygen source 28.

Particularly, the first gas intake device 23 is installed along the aforesaid first connecting pipe 25 and the second gas intake device 24 is installed along the said second connecting pipe 27.

In accordance with the foregoing, it follows, in particular, that the first auxiliary pressure regulator 40 is positioned downstream the specific high pressure manual regulator (or reducer) 29 of conventional type (which reduces pressure from 200 bar or 300 bar up to 8 bar), already at the current state of the art commonly connected with the tap 26a mounted on the top of the pressurized Helium source 26 (typically consisting of a large metallic gas cylinder or tank containing gas up to 200 or 300 bar) and the second auxiliary pressure regulator 41 is positioned downstream the specific high pressure manual regulator (or reducer) 30 of conventional type (which reduces pressure from 200 bar or 300 bar up to 8 bar), already at the current state of the art commonly connected with the tap 28*a* mounted on the top of the pressurized Oxygen source 28 (typically constituted by a large metallic cylinder or tank containing gas up to 200 or 300 bar).

In proper and particular way, the first auxiliary pressure regulator 40 and the second auxiliary pressure regulator 41, of electromechanical type and electronically controlled, are designed to operate at a maximum pressure value of 8 bar.

More specifically, the first auxiliary pressure regulator 40 and the second auxiliary pressure regulator 41 are set with a maximum pressure value in the range between 0.5 bar and 8 bar.

From the point of view of the constructive features, preferably, the first auxiliary pressure regulator 40 and the second auxiliary pressure regulator 41 are of electro-pneumatic type and of the type commonly available on the market and known to the skilled man in the art.

In addition, the first auxiliary pressure regulator (or reducer) 40 and the second auxiliary pressure regulator (or reducer) 41 have an adjustment proportional to an electrical signal.

In appropriate and advised, although optional, manner, the improved apparatus 1 of the present invention also comprises a safety solenoid valve 42, 43 electrically connected with the electronic control unit 35 which manages its operation: in particular the safety solenoid valve 42 is installed along the first connecting pipe 25 between the first auxiliary pressure regulator 40 and the first servo-controlled throttling valve 33, while the safety solenoid valve 43 is installed along the first connecting pipe 25 between the second auxiliary pressure regulator 41 and the second servo-controlled throttling valve 34.

The safety solenoid valve 42, 43 is actuated by the electronic control unit 35 in potential risky situations, to avoid gas (Oxygen or Helium) droplets when the compressor 2 is switched again on after a mixing cycle, or to avoid gas (Oxygen) peaks or even more, generically, in presence of any functional anomaly signaled to the control electronic unit 35 itself.

In advantageous although non limiting manner, the improved apparatus 1 of the invention comprises an openable box casing 39 (not visible in FIG. 1, where it is indicated by a simple explanatory hatching) in which the first auxiliary pressure regulator 40 and the second auxiliary pressure regulator 41 are also contained, in addition to the first servo-controlled throttling valve 33, the second servo-controlled throttling valve 34 and the electronic control unit 35 managing the first throttling valve 33, the second throttling valve 34, the first auxiliary regulator pressure 40 and the second auxiliary pressure regulator 41.

Therefore, the box casing 39 that can be opened and inspected has a function of properly protecting the most delicate and sophisticated elements of the apparatus 1 of the invention.

In particular, the electronic control unit 35 is adapted to manage the operation of the first servo-controlled throttling valve 33 and the second servo-controlled throttling valve 34 simultaneously and in combination with that one of the first auxiliary pressure regulator 40 and the second auxiliary pressure regulator 41.

By way of purely preferred and indicative purpose, the apparatus for feeding gas mixtures 1 of the invention further comprises an external control panel 36 (or other type of user interface) through which the user can set/communicate to the electronic control unit 35 the percentages of oxygen, nitrogen and helium that the breathable gas mixture to be got/made within the cylinder 4 must possess.

In addition to the foregoing, the apparatus for feeding gas mixtures 1 of the invention also includes, at preferred but not binding title, an electrically driven exhaust valve 37 positioned along the discharge manifold 9, preferably immediately upstream the shut-off valve or valves 10, and is structured in such a way as to selectively divert/discharge directly to the outside of the manifold the flow of air or other gaseous mixture at high pressure flowing along the discharge manifold 9 before it can reach the shut-off valve or valves 10.

The electronic control unit 35 also manages the exhaust valve 37 depending on the signals coming from the two oxygen-measurement sensors 31 and 32.

In the constructive example shown in FIG. 1, in particular, the exhaust valve 37 is preferably constituted by an electrically operated three-way valve, which is positioned along the discharge manifold 9, right upstream the shut-off valve or valves 10, and is structured in so as to position the section of the discharge manifold 9 located upstream the discharge valve 37, i.e. the section of the discharge manifold connected with the pump assembly 5, in direct communication, by choice and alternatively, with the outside environment or with the section of the discharge manifold 9 located downstream the exhaust valve 37, i.e. the section of the discharge manifold 9 connected with the shut-off valve or valves 10.

Instead, the electronic control unit 35 is preferably adapted to operate/open the discharge valve 37 to release the flow of air or other gaseous mixture at high pressure from the pump assembly 5, or rather from the filtering assembly 16, at the initial stage of the loading process of the cylinder or cylinders 4, when the oxygen, nitrogen and helium percentages of the breathable gas mixture coming out of the mixing pipe 22 and entering the sucking manifold 8 of the high pressure compressor 2 have not yet been stabilized in the neighborhood of their respective target values.

Preferably, but not necessarily, the improved apparatus for feeding gas mixtures 1 of the present invention, finally, comprises a third Oxygen-measurement sensor 38 which is positioned inside the box casing 39 housing the electronic control unit 35 and the two servo-controlled throttling valves 33 and 34 and is suitable to provide at the output a signal indicating the percentage of oxygen present inside the box casing 39.

The electronic control unit 35 is connected with the third Oxygen-measurement sensor 38 and is suitable to completely close and then power down the two servo-controlled throttling valves 33 and 34 when the percentage of oxygen present inside the box casing 39 exceeds a predefined limit value.

Preferably but not exclusively, the electronic control unit 35 is, finally, connected with the control unit 18 of the compressor, in such a way as to be able to determine in real time whether the high pressure compressor 2 is on and is charging the cylinder 4, or it is off.

The operation of the high pressure compressor 2 is similar to that one of any other high pressure compressor for the filling of diving cylinders currently on the market, and therefore it does not need further explanations.

As far as the operation of the improved apparatus for feeding gas mixtures 1 of the invention is concerned, instead, reference is made herein to what is described in the Italian patent no. 1415144 for the part involving the technical features contained in the preamble (or pre-characterizing part) of the appended claim 1, while for the part involving the inventive nucleus of the present invention and the technical features contained in the characterizing part of the attached claim 1, reference is made to the foregoing in the present discussion or to what clearly inferable by the technical man skilled in the art.

In any case, it should be noted that at the beginning the user adjusts the pressure of the Helium tank 26 and of the Oxygen tank 28 up to the value of 8 bar fixed and subsequently the operation of the improved apparatus 1 for feeding gas mixtures at the intake of a high pressure compressor 2 by means of the electronic control unit 35 which, if necessary, further adjusts the pressure between 0 bar and 8 bar by intervening on the auxiliary pressure regulators (or reducers) 40 and 41 contained in the box casing 39.

By virtue of the description just provided, it is, therefore, understood that the improved apparatus for feeding gas mixtures at the intake of a high pressure compressor, object of the invention, achieves the purposes and reaches the advantages already mentioned.

The advantages associated with the improved apparatus for feeding gas mixtures 1 described above of the invention and with the particular feedback control implemented by the electronic control unit 35 on the electric motors of the two throttling valves 33 and 34, depending on the signals coming from the two oxygen-measurement sensors 31 and 32, and on the auxiliary pressure regulators 40, 41 are considerable and however not negligible, allowing the user to obtain flow rates (in liters/minute) of gaseous mixture, variable in a time frame wider than that one imposed by the constructive limits of the flow regulators 33 and 34, more quickly and more precisely and effectively than the current state of the art.

It is, finally, clear that several other changes could be made to the improved apparatus for feeding gas mixtures at the intake of a high pressure compressor concerned, without departing from the principle of novelty intrinsic in the inventive idea expressed herein, as it is clear that, in the practical implementation of the invention, materials, shapes and sizes of the illustrated details could be changed, as needed, and replaced with others technically equivalent.

Where the constructive features and techniques mentioned in the following claims are followed by reference numbers or signs, those reference signs have been introduced with the sole objective of increasing the intelligibility of the claims themselves and therefore they have no limiting effect on the interpretation of each element identified, by way of example only, by these reference signs.

The invention claimed is:

1. An apparatus for feeding gas mixtures at the intake of a high pressure compressor, the apparatus comprising:
    a tubular mixing pipe which presents a first end configured to be connected with the intake of a sucking manifold of a high pressure compressor;
    a first gas intake device placed along said mixing pipe and configured to inject inside said mixing pipe the gas which is received from a pressurized Helium source;
    a second gas intake device placed along said mixing pipe, downstream from said first gas intake device and configured to inject inside said mixing pipe the gas which is received from a pressurized Oxygen source;
    a first and a second Oxygen-measurement sensor placed along said mixing pipe, downstream respectively from said first and said second gas intake devices, each configured to measure/determine a percentage of Oxygen of the gas mixture;
    a first servo-controlled throttling valve interposed between said first gas intake device and said pressurized Helium source and configured to adjust/control the gas flow directed towards said first gas intake device;
    a second servo-controlled throttling valve interposed between said second gas intake device and said pressurized Oxygen source and configured to adjust/control the gas flow directed towards said second gas intake device;
    an electronic control unit configured to drive said first and second throttling valve on a basis of the Oxygen percentages of said gas mixture measured/determined by said Oxygen-measurement sensors, wherein percentages of Oxygen, Nitrogen and Helium of said gas mixture coming out of said mixing pipe are maintained substantially equal to prefixed target percentages of Oxygen, Nitrogen and Helium,
    wherein a first auxiliary pressure regulator and a second auxiliary pressure regulator are both electrically connected with said electronic control unit which is configured to manage the operation thereof, the first auxiliary pressure regulator being interposed between said first servo-controlled throttling valve and a high pressure manual regulator of said pressurized Helium source, said first auxiliary pressure regulator being configured to vary the pressure of said Helium entering into said first servo-controlled throttling valve, and the second auxiliary pressure regulator being interposed between said second servo-controlled throttling valve and a high pressure manual regulator of said pressurized Oxygen source, said second auxiliary pressure regulator being configured to vary the pressure of said Oxygen entering into said second servo-controlled throttling valve.

2. The apparatus according to claim 1, wherein said first auxiliary pressure regulator is installed along a first connecting pipe which is configured to connect said first gas intake device with said pressurized Helium source, and said second auxiliary pressure regulator is installed along a second connecting pipe which is configured to connect said second gas intake device with said pressurized Oxygen source.

3. The apparatus according to claim 2, wherein said first gas intake device is installed along said first connecting pipe and said second gas intake device is installed along said second connecting pipe.

4. The apparatus according to claim 1, wherein said auxiliary pressure regulators are designed to operate at a maximum pressure value of 8 bars.

5. The apparatus according to claim 4, wherein said first auxiliary pressure regulator and said second auxiliary pressure regulator are designed to operate at a maximum pressure value between 0.5 bar and 8 bars.

6. The apparatus according to claim 3, wherein said first auxiliary pressure regulator and said second auxiliary pressure regulator are of an electro-pneumatic type.

7. The apparatus according to claim 1, wherein said first auxiliary pressure regulator and said second auxiliary pressure regulator have an adjustment proportional to an electric signal.

8. The apparatus according to claim 1, wherein said high pressure manual regulator of said Helium source is commonly connected to a tap installed on an upper part of said pressurized Helium source and said high pressure manual regulator of said Oxygen source is commonly connected to a tap installed on an upper part of said pressurized Oxygen source.

9. The apparatus according to claim 1, wherein a first safety solenoid valve is electrically connected with said electronic control unit, and is installed between said first auxiliary pressure regulator and said first servo-controlled throttling valve, and a second safety solenoid valve is electrically connected with said electronic control unit, and is installed between said second auxiliary pressure regulator and said second servo-controlled throttling valve.

10. The apparatus according to claim 1, wherein an openable box casing contains at least said first auxiliary pressure regulator and said second auxiliary pressure regulator.

11. The apparatus according to claim 1, wherein said electronic control unit is configured to manage the operation of said first servo-controlled throttling valve and said second servo-controlled throttling valve in relation to at least one of said first auxiliary pressure regulator and said second auxiliary pressure regulator.

\* \* \* \* \*